S. A. DEANES.
AUTOMOBILE HOOD.
APPLICATION FILED FEB. 16, 1917.
1,241,933.
Patented Oct. 2, 1917.
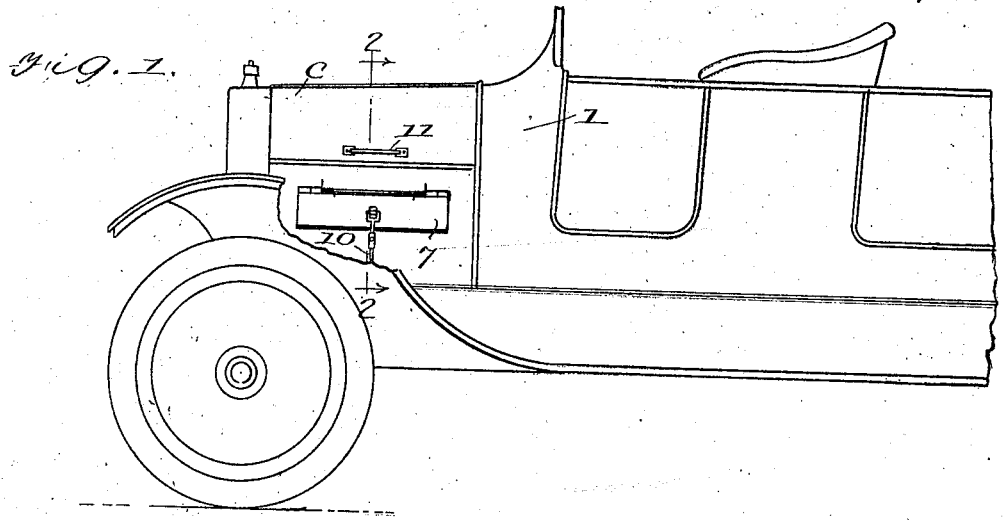
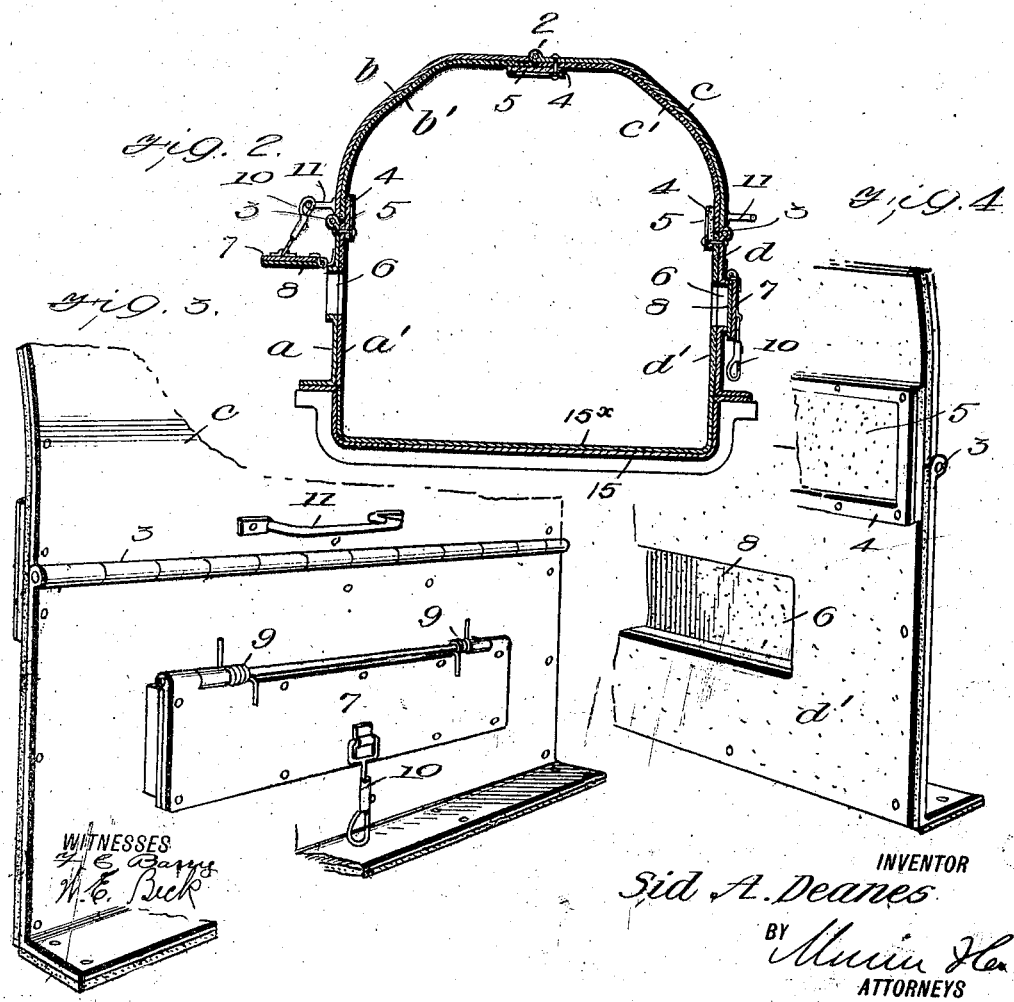
INVENTOR
Sid A. Deanes
BY
ATTORNEYS
WITNESSES

UNITED STATES PATENT OFFICE.

SID A. DEANES, OF WEST POINT, MISSISSIPPI.

AUTOMOBILE-HOOD.

1,241,933.     Specification of Letters Patent.     Patented Oct. 2, 1917.

Application filed February 16, 1917. Serial No. 149,085.

*To all whom it may concern:*

Be it known that I, SID A. DEANES, a citizen of the United States, and a resident of West Point, in the county of Clay and State of Mississippi, have invented certain new and useful Improvements in Automobile-Hoods, of which the following is a specification.

My invention relates to improvements in automobile hoods, and it consists in the combinations, constructions and arrangements herein described and claimed.

An object of my invention is to provide an automobile hood which may be used both winter and summer, and which will obviate the necessity of providing an unsightly hood cover during cold weather.

A further object of my invention is to provide an automobile hood having hinged portions with means for preventing the escape of heat from the hood in cold weather through the joints of the hinged hood when it is desired to retain such heat, as for instance, in very cold weather.

A further object of my invention is to provide means for opening the hood to permit the escape of heated air around the engine when desired.

Other objects and advantages will appear in the following specification, and the novel features of the invention will be particularly pointed out in the appended claims.

My invention is illustrated in the accompanying drawing, forming a part of this application, in which:

Figure 1 is a side view of an automobile provided with my improved hood.

Fig. 2 is a section along the line 2—2 of Fig. 1.

Fig. 3 is a perspective view of a portion of the hood.

Fig. 4 is a perspective view of the interior of a portion of the hood.

In carrying out my invention I make use of an automobile 1 of any suitable shape. The hood is preferably made in four sections, these sections being shown in Fig. 2 at $a$, $b$, $c$, and $d$, the sections $a$ and $d$ are alike and the sections $b$ and $c$ are alike. All of these sections are made of pressed or stamped sheet metal, and each section is lined with an asbestos or other heat resisting lining, these linings being shown at $a'$, $b'$, $c'$ and $d'$ respectively. The sections $b$ and $c$ are joined together by a hinge 2, and the sections $a$ and $b$, as well as the sections $d$ and $c$ are hinged together by hinges 3.

On the interior portion of the hood at the joints between the hinged sections, are secured light metal frames 4 which carry heat resisting sheets 5, these sheets being preferably made of asbestos. It will be observed that the frames 4 are secured only on one section. When the hood is in position on the machine (see Fig. 2), the asbestos sheets 5 lap over the joints, thereby effectively preventing the escape of heat. This, however, will not prevent the bending of the hood portions at their hinged joints.

The lower portions $a$ and $b$ each have ventilating openings 6 which are covered normally by flaps or doors 7, these doors having heat resisting linings 8, preferably of asbestos. The doors or flaps 7 are held in closed position by means of springs 9. A snap hook 10 is provided on the outer side of each of the doors 7, and is arranged to engage the handle 11 on one of the hood sections $b$ and $c$ so as to hold the door or flap 7 in an open position, as shown at the left of Fig. 2, when it is desired to ventilate the hood. The hood is designed to be secured to the frame of the car in any suitable manner. The provision of the heat resisting lining, and means for preventing the escape of heat, obviates the necessity of covering the metal hood with a cover. In winter or when the weather is cold, the snap hooks 10 are released from the handles 11, and the doors 7 are held in closed position over the ventilating openings 6 by the springs 9. When it is desired to ventilate the hood, both doors may be raised and held in position in the manner described.

The device may thus be used both in warm and cold weather. The doors or flaps 7 serve another purpose, to wit; they afford access to the engine on each side thereof without the necessity of raising one side of the hood. Thus one may loosen the lock nut which holds the needle valves on small cars of popular make, without raising the hood at all.

It will be noted that the bottom 15 of the frame which supports the engine is also provided with an asbestos lining $15^x$. This bottom is continuous, that is to say, there are no openings except those which are absolutely necessary, the idea being to seal the bottom as effectually as possible, so as to prevent the entrance of cold air when it is desired to keep the engine as warm as possible.

I claim:

1. A hood for automobiles comprising a plurality of hinged sections, the lower section on each side of the hood having a ventilating opening, and a spring pressed door or flap for normally closing said opening.

2. A hood for automobiles comprising a plurality of hinged sections, the lower section on each side of the hood having a ventilating opening, a spring pressed door or flap for normally closing said opening, and means carried by the door for holding the latter in open position to permit the passage of air through the opening.

3. A hood for automobiles, comprising a plurality of hinged sections, a non-heat conducting lining for each section, handles carried by certain of the upper sections, the lower section on each side being provided with a ventilating opening, a spring pressed door or flap for normally closing each said opening, and a hook carried by each said door and arranged to engage the handle on the upper section for holding the door in open position.

SID A. DEANES.